United States Patent [19]

Okazaki

[11] Patent Number: 5,699,372
[45] Date of Patent: Dec. 16, 1997

[54] WAVELENGTH-CONVERSION SOLID-STATE LASER

[75] Inventor: Yoji Okazaki, Kanagawa-ken, Japan

[73] Assignee: Fuji Photo Film Co., Ltd., Kanagawa, Japan

[21] Appl. No.: 535,464

[22] Filed: Sep. 28, 1995

[30] Foreign Application Priority Data

Oct. 20, 1994 [JP] Japan .................... 6-255037

[51] Int. Cl.⁶ .................................................. H01S 3/10
[52] U.S. Cl. ........................ 372/21; 372/11; 372/14; 372/22; 372/105
[58] Field of Search ................ 372/11, 14, 20, 372/21, 22, 105

[56] References Cited

U.S. PATENT DOCUMENTS

| | | | |
|---|---|---|---|
| 5,260,963 | 11/1993 | Baird et al. | 372/95 |
| 5,278,851 | 1/1994 | Goto | 372/21 |
| 5,317,447 | 5/1994 | Baird et al. | 372/22 |
| 5,497,388 | 3/1996 | Goto et al. | 372/22 |
| 5,506,860 | 4/1996 | Hyuga et al. | 372/21 |

*Primary Examiner*—Brian Healy
*Assistant Examiner*—Robert E. Wise
*Attorney, Agent, or Firm*—Sughrue, Mion, Zinn, Macpeak & Seas, PLLC

[57] ABSTRACT

A wavelength-conversion solid-state laser capable of generating a ultraviolet laser beam with high efficiency. The wavelength-conversion solid-state laser is made up of a phonon-based solid-state laser crystal, a semiconductor laser which emanates pump light to pump the phonon-based solid-state laser crystal, a laser resonator, a wavelength selection element which selects an oscillation wavelength, and a nonlinear optical crystal which generates a sum frequency of a solid-state laser beam, whose wavelength is selected by the wavelength-selection element, and the pump light. The phonon-based solid-state laser crystal is pumped with pump light emitted from the semiconductor laser, as a result of which a solid-state laser beam is emitted. A sum frequency of the solid-state laser beam and the pump beam is produced by enabling them to pass through the nonlinear optical crystal.

9 Claims, 1 Drawing Sheet

WAVELENGTH-CONVERSION SOLID-STATE LASER

BACKGROUND OF THE INVENTION

1. Field of the Invention

The present invention relates to a solid-state laser, and more particularly to a wavelength-conversion solid-state laser capable of generating ultraviolet rays.

2. Description of the Related Art

Conventionally, a solid-state laser which converts a fundamental wave into a fourth order harmonic wave and a third order harmonic wave (a fundamental wave and a sum frequency of a second harmonic wave of the fundamental wave) by causing the fundamental wave, i.e., a solid-state laser beam, pass through two nonlinear optical crystals is known as a solid-state laser which generates a laser beam outside the ultraviolet range.

However, the conventional wavelength-conversion solid-state laser of this type is intended to generate a higher-order harmonic wave and therefore is extremely inefficient. For this reason, the wavelength-conversion solid-state laser for generating ultraviolet rays is solely limited to a Q-switching type solid-state laser which employs lamp pumping technology, and there is no ultraviolet ray solid-state laser which can continuously operate utilizing semiconductor laser pumping.

For the conventional wavelength-conversion solid-state laser of the above mentioned type, the oscillation wavelength of the fundamental wave is limited, and hence it was impossible for the solid-state laser to obtain ultraviolet rays at an arbitrary wavelength.

SUMMARY OF THE INVENTION

The present invention is conceived to solve the above drawbacks in the prior art, and the object of the present invention is to provide a wavelength-conversion solid-state laser capable of generating ultraviolet rays with a high degree of efficiency and generating ultraviolet rays at an arbitrary wavelength.

The above object of the present invention is attained by a wavelength-conversion solid-state laser, according to a first aspect of the present invention, comprising:

a phonon-based solid-state laser crystal;

a semiconductor laser which emanates pump light to pump the phonon-based solid-state laser crystal;

a laser resonator;

a wavelength selection element which selects an oscillation wavelength; and a nonlinear optical crystal which generates a sum frequency of a solid-state laser beam, whose wavelength is selected by the wavelength-selection element, and the pump light.

According to a second aspect of the present invention, the object is achieved by a wavelength-conversion solid-state laser comprising:

a phonon-based solid-state laser crystal;

a semiconductor laser which emanates pump light to pump the solid-state laser crystal;

a semiconductor laser which is provided separately from the pump source semiconductor laser for generating a fundamental wave;

a laser resonator;

a wavelength selection element which selects an oscillation wavelength; and a nonlinear optical crystal which generates a sum frequency of a solid-state laser beam, whose wavelength is selected by the wavelength-selection element, and a laser beam emanated from the fundamental-wave generation semiconductor laser.

A Cr:LiSAF ($Cr^{3+}$:LiSrAlF$_6$) crystal as disclosed in, for example, U.S. Pat. No. 5,260,963 and a CR:LiCAF($Cr^{3+}$:LiCaAlF$_6$) crystal should preferably be used for the phonon-based solid-state laser crystal.

A birefringent filter, a prism, or a grating structure to be disposed in a laser resonator can be used for the wavelength-selection element. However, it is preferable to use an element capable of changing the selected wavelength. For example, a birefringent which is retained in the laser resonator in such a way as to change its inclination with respect to the optical axis of the laser should preferably be used.

The absorption spectral range of the Cr:LiSAF crystal and the Cr:LiCAF crystal is about in the range of 600–700 nm, and the emission spectral range of them is about in the range of 750–900 nm. In the wavelength-conversion solid-state laser in the first aspect of the present invention, a semiconductor laser which emits light at a waveband ranging between 600 and 700 nm is used for the pump source semiconductor laser. If the sum frequency of the pump light and a solid-state laser beam at a waveband ranging between 750 and 900 nm is generated, the sum frequency will be outside the ultraviolet range having a wavelength of less than 390 nm.

The same semiconductor laser is used for the pump source semiconductor laser of the wavelength-conversion solid-state laser according to the second aspect of the present invention. If the semiconductor laser which emanates laser at an appropriate wavelength is used for the fundamental wave generation semiconductor laser, a sum frequency of a laser beam emanated from the fundamental wave generation semiconductor laser and the solid-state laser beam becomes outside the ultraviolet range.

In this way, the wavelength-conversion solid-state laser generates a sum frequency of the laser beam emitted from the semiconductor laser and the solid-state laser beam. Accordingly, it becomes unnecessary to let the fundamental wave to pass through a plurality of nonlinear optical crystals when a higher-order harmonic wave is generated, thereby resulting in efficient continuous generation of ultraviolet rays.

The wavelength selection element can select the wavelength of the solid-state laser beam which acts as the fundamental wave in the range of 750–900 nm, whereby the wavelength of ultraviolet rays (the sum frequency) can be freely selected.

If an element capable of changing a selected wavelength is used for the wavelength selection element, the wavelength of the solid-state laser beam can be arbitrarily changed in the range of 750–900 nm, which makes it possible to arbitrarily change the wavelength of the ultraviolet rays (the sum frequency).

DESCRIPTION OF THE PREFERRED EMBODIMENTS

Figure 1:
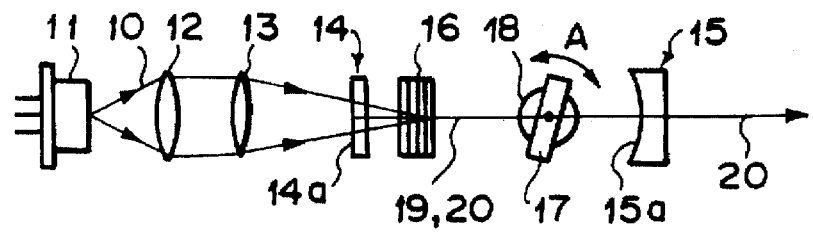
FIG. 1 is a side elevation showing a wavelength-conversion solid-state laser according to a first embodiment of the present invention.

With reference to the accompanying drawings, preferred embodiments of the present invention will now be described in detail. FIG. 1 shows a wavelength-conversion solid-state laser according to a first embodiment of the present invention. The wavelength-conversion solid-state laser is made up of a semiconductor laser 11 which emits a laser beam 10 as pump light, a collimator lens 12 for collimating the divergent laser beam 10, a condenser lens 13 which focuses the collimated laser beam 10, a Cr:LiSAF crystal 14 which is a phonon-based solid-state laser crystal, a resonator mirror 15 disposed in front of the Cr:LiSAF crystal 14 (i.e., on the right side in the drawing), an MgO:LN crystal (LiNbO₃ crystal) 16 interposed between the resonator mirror 15 and the Cr:LiSAF crystal 14, and a birefringent filter 17 interposed between the resonator mirror 15 and the Cr:LiSAF crystal 14.

The MgO:LN crystal 16 has a periodic domain reversal structure in which the directions of spontaneous polarization (domains) are periodically inverted. The birefringent filter 17 is made of birefringent materials such as calcite, and the filter is supported by a rotatable holding member 18 in such a way that it freely rotates in the direction designated by arrow A, that is, in the direction where the inclination of the filter with respect to the optical axis of the laser changes.

These elements are mounted on a not-illustrated common housing in an integrated fashion. As will be described later, a resonator of the solid-state laser, which consists of the Cr:LiSAF crystal 14 and the resonator mirror 15, and the semiconductor laser 11 are maintained at a predetermined temperature by means of a Peltier element and a temperature control circuit (both being not shown).

The single-mode semiconductor laser 11 emits a laser beam 10 at 690 nm and has an output of 100 mW. A rear-side end face 14a of the Cr:LiSAF crystal 14 and a mirror surface 15 a of the resonator mirror 15 are respectively covered with a coating which has a reflectance of 99.9% with respect to light at 830 nm, and the combination of the rear end face and the mirror surface constitutes a resonator of the solid-state laser.

The laser beam 10 at 690 nm enters the Cr:LiSAF crystal 14, so that the Cr:LiSAF crystal 14 is pumped to emit light at 830 nm. The light at 830 nm oscillates between the rear-side end face 14a of the crystal 14 and the resonator mirror surface 15a. A laser beam 19 at 830 nm obtained as a result of the oscillation of the laser beam 10 is confined in the resonator, whereby a large internal power is obtained. The laser beam 19 and the laser beam 10 at 690 nm which was not absorbed by the Cr:LiSAF crystal 14 enter the MgO:LN crystal 16 and are converted into a sum frequency 20 by means of the MgO:LN crystal 16. The resonator mirror 15 with its mirror surface 15a being covered with a predetermined coating allows only the sum frequency 20 to exit.

Assuming that the wavelength of the laser beam 10 is $\lambda_{LD}$, the wavelength of the laser beam 19 is $\lambda_{FM}$, and the wavelength of the sum frequency 20 is $\lambda_{SGF}$, we have $$1/\lambda_{SFG} = 1/\lambda_{LD} + 1/\lambda_{FM}.$$

In this embodiment, since $\lambda_{LD}=690$ nm and $\lambda_{FM}=830$ nm, $\lambda_{SFG}=377$ nm is obtained from the above expression, whereby the sum frequency 20 consisting of ultraviolet rays is obtained. In this embodiment, the output of the sum frequency 20 is about 1 mW.

The birefringent filter 17 is controlled in such a way as to be tilted at the Brewster angle with respect to light at 830 nm by controlling the pivotal position of the holding member 18. As a result of this, 830 nm is selected as the oscillation wavelength of the solid-state laser, and hence 370 nm is selected as the wavelength of the sum frequency 20.

Figure 2:
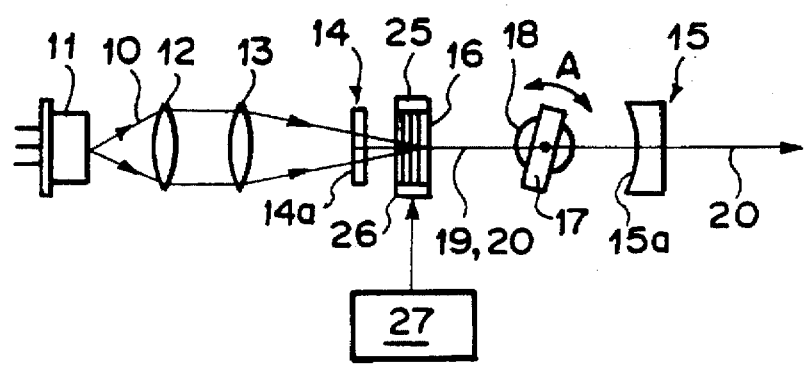
FIG. 2 is a side elevation showing a wavelength-conversion solid-state laser according to a second embodiment of the present invention.

A wavelength-conversion solid-state laser according to a second embodiment of the present invention will be described with reference to FIG. 2. In FIG. 2, the same reference numerals are provided to designate the corresponding features shown in FIG. 1, and the explanation thereof will be omitted here for brevity (this applies to a third embodiment).

In the wavelength-conversion solid-state laser of the second embodiment, the MgO:LN crystal 16 having a periodic domain reversal structure is provided with electrodes 25 and 26. A large magnitude of variable voltage is applied to the crystal 16 from a voltage application circuit 27 via the electrodes 25 and 26.

In this configuration, the oscillation wavelength of the solid-state laser or the oscillation wavelength of the semiconductor laser 11 is changed by varying the inclination of the birefringent filter 17. The effective period of the domain reversals is changed by varying the voltage applied to the MgO:LN crystal 16 corresponding to variations in the oscillation wavelength of the solid-state laser or the semiconductor laser 11, which makes it possible to change the wavelength of the sum frequency 20.

Figure 3:
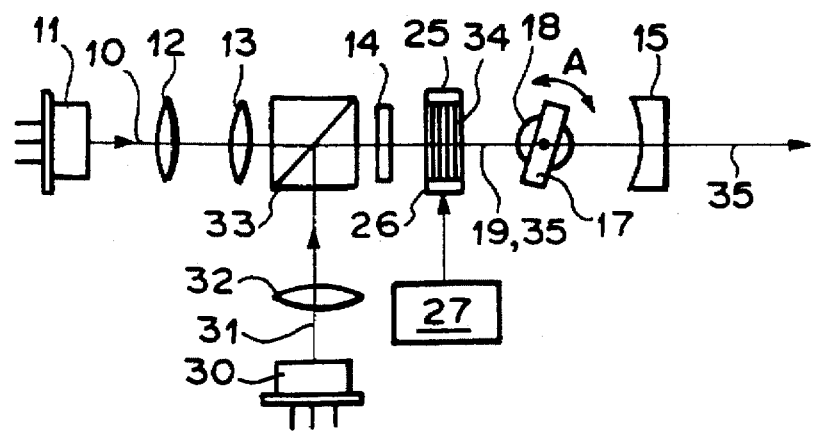
FIG. 3 is a side elevation showing a wavelength-conversion solid-state laser according to a third embodiment of the present invention.

With reference to FIG. 3, a wavelength-conversion solid-state laser according to a third embodiment of the present invention will now be described. In the wavelength-conversion solid-state laser of the third embodiment, a semiconductor laser 30 is provided separately from the pumping semiconductor laser 11 for generating the fundamental wave. A laser beam 31 emanated from the laser 30 is collimated by a collimator lens 32, and it is merged with the laser beam 10 upon entering a beam splitter 33.

The MgO:LN crystal 34 generates the sum frequency 35 of a laser beam 31 which entered the MgO:LN crystal 34 and the solid-state laser beam 19. In this case, on the assumption that the wavelength $\lambda_{LD}$ of the laser beam 31 is 681 nm and the wavelength $\lambda_{FM}$ of the solid-state laser beam 19 is 830 nm, the wavelength $\lambda_{SFG}$ of the sum frequency 35 becomes 374 nm as per the previously mentioned expression.

A master oscillator power amplifier (MOPA) semiconductor laser and a tapered amplifier type high-power semiconductor laser may be used for the pumping semiconductor laser or the fundamental-wave generation semiconductor laser. These types of semiconductor laser provide a laser beam having an output of more than 500 mW, and hence a ultraviolet laser beam having a higher power can be generated.

In addition to the previously mentioned CR:LiSAF crystal 14, a Cr:LiCAF crystal and an alexandrite laser crystal may be used for the phonon-based solid-state laser crystal. Further, the nonlinear optical crystal is not limited to the previously mentioned MgO:LN crystal with periodic domain reversals, and, as a matter of course, other known crystals may be used in lieu of the MgO:LN crystal.

Several embodiments of the present invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. A wavelength-conversion solid-state laser comprising:

a phonon-based solid-state laser crystal;

a semiconductor laser which emanates pump light to pump the phonon-based solid-state laser crystal;

a laser resonator;

a wavelength selection element which selects an oscillation wavelength; and a nonlinear optical crystal which generates a sum frequency of a solid-state laser beam, whose wavelength is selected by the wavelength-selection element, and the pump light.

2. The wavelength-conversion solid-state laser as defined in claim 1, wherein the solid-state laser crystal is a Cr:LiSAF crystal.

3. The wavelength-conversion solid-state laser as defined in claim 1, wherein the solid-state laser crystal is a Cr:LiCAF crystal.

4. A wavelength-conversion solid-state laser comprising:

a phonon-based solid-state laser crystal;

a semiconductor laser which emanates pump light to pump the solid-state laser crystal;

a semiconductor laser which is provided separately from the pump source semiconductor laser for generating a fundamental wave;

a laser resonator;

a wavelength selection element which selects an oscillation wavelength; and a nonlinear optical crystal which generates a sum frequency of a solid-state laser beam, whose wavelength is selected by the wavelength-selection element, and a laser beam emanated from the fundamental-wave generation semiconductor laser.

5. The wavelength-conversion solid-state laser as defined in claim 4, wherein the solid-state laser crystal is a Cr:LiSAF crystal.

6. The wavelength-conversion solid-state laser as defined in claim 4, wherein the solid-state laser crystal is a Cr:LiCAF crystal.

7. The wavelength-conversion solid-state laser as defined in any of claims 1 to 6, wherein an element capable of changing a selected wavelength is used for the wavelength selection element.

8. The wavelength-conversion solid-state laser as defined in claim 7, wherein the wavelength selection element is a birefringent filter which is retained in a resonator of the laser in such a way that the inclination of the wavelength-selection element with respect to the optical axis of the laser is changed.

9. The wavelength-conversion solid-state laser as defined in any one of claims 1–6, wherein an element with periodic domain reversals is used for the nonlinear optical crystal, and the wavelength-conversion solid-state laser is provided with voltage application means which changes the effective period of the domain reversals by applying a variable voltage to the nonlinear optical crystal.

* * * * *